(12) United States Patent
Nagasaki et al.

(10) Patent No.: US 11,656,415 B2
(45) Date of Patent: May 23, 2023

(54) OPTICAL CONNECTOR CABLE

(71) Applicant: SUMITOMO ELECTRIC INDUSTRIES, LTD., Osaka (JP)

(72) Inventors: Taisuke Nagasaki, Osaka (JP); Takeshi Inoue, Osaka (JP); Toshihisa Yokochi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/678,118

(22) Filed: Feb. 23, 2022

(65) Prior Publication Data
US 2022/0283388 A1 Sep. 8, 2022

(30) Foreign Application Priority Data

Mar. 4, 2021 (JP) .............................. JP2021-034557

(51) Int. Cl.
*H04B 10/00* (2013.01)
*G02B 6/42* (2006.01)

(52) U.S. Cl.
CPC ........... *G02B 6/4206* (2013.01); *G02B 6/428* (2013.01); *G02B 6/4239* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,327,517 A * | 7/1994 | Yamada | ................... | G02B 6/30 385/50 |
| 5,420,952 A * | 5/1995 | Katsura | ................ | G02B 6/3861 385/80 |
| 5,422,971 A * | 6/1995 | Honjo | .................. | G02B 6/3861 385/139 |
| 5,463,708 A * | 10/1995 | Yui | ....................... | G02B 6/4248 385/49 |
| 5,481,632 A * | 1/1996 | Hirai | ........................ | G02B 6/30 385/80 |
| 5,500,917 A * | 3/1996 | Daniel | ................. | G02B 6/3861 385/94 |
| 5,627,930 A * | 5/1997 | Ishiguro | ............... | G02B 6/2835 385/48 |

(Continued)

FOREIGN PATENT DOCUMENTS

JP 2019-078776 A 5/2019

*Primary Examiner* — Agustin Bello
(74) *Attorney, Agent, or Firm* — Oliff PLC

(57) ABSTRACT

Disclosed is an optical connector cable including a plurality of optical fibers, a lens module, and an adhesive portion. Each of the plurality of optical fibers extends in a first direction. The lens module includes a placement structure configured to place the plurality of optical fibers thereon in order in a second direction intersecting the first direction and a plurality of lenses optically coupled to tip ends of the plurality of optical fibers. The adhesive portion fixes the plurality of optical fibers to the placement structure with an adhesive. The adhesive portion includes a first adhesive portion located near the tip ends of the plurality of optical fibers and a second adhesive portion located behind the first adhesive portion in the first direction. The second adhesive portion has a Young's modulus higher than that of the first adhesive portion.

12 Claims, 9 Drawing Sheets

(56) References Cited

U.S. PATENT DOCUMENTS

| | | | | |
|---|---|---|---|---|
| 5,694,509 A * | 12/1997 | Uemura | G02B 6/2835 | 385/99 |
| 6,086,704 A * | 7/2000 | Kanai | G02B 6/3861 | 385/80 |
| 6,220,764 B1 * | 4/2001 | Kato | G02B 6/4204 | 264/1.25 |
| 6,269,210 B1 * | 7/2001 | Yagi | G02B 6/4403 | 385/110 |
| 6,304,708 B1 * | 10/2001 | Fukuyama | G02B 6/3839 | 385/83 |
| 6,415,093 B1 * | 7/2002 | Nakamura | C03C 27/10 | 385/141 |
| 6,430,350 B1 * | 8/2002 | Bookbinder | G02B 6/02209 | 385/136 |
| 6,993,220 B2 * | 1/2006 | Shinozaki | G02B 6/0218 | 385/99 |
| 7,021,842 B2 * | 4/2006 | Yamada | G02B 6/3652 | 385/136 |
| 7,748,913 B2 * | 7/2010 | Oba | G02B 6/2558 | 385/127 |
| 7,896,559 B2 * | 3/2011 | Yi | H01R 13/502 | 385/75 |
| 8,721,191 B2 * | 5/2014 | Ishii | G02B 6/4267 | 385/88 |
| 9,201,194 B2 * | 12/2015 | Ooba | G02B 6/12 | |
| 10,101,541 B2 * | 10/2018 | Nakama | G02B 6/3861 | |
| 10,295,749 B1 * | 5/2019 | Janta-Polczynski | G02B 6/30 | |
| 10,684,429 B2 | 6/2020 | Inoue et al. | | |
| 10,823,922 B2 | 11/2020 | Nagasaki et al. | | |
| 10,838,154 B2 * | 11/2020 | Nagasaki | G02B 6/4292 | |
| 10,877,228 B2 * | 12/2020 | Hirano | G02B 6/4239 | |
| 2002/0085826 A1 * | 7/2002 | Matsumoto | G02B 6/3636 | 385/83 |
| 2002/0172473 A1 * | 11/2002 | Kerboeuf | G02B 6/421 | 385/88 |
| 2002/0181853 A1 * | 12/2002 | Ido | G02B 6/4265 | 385/27 |
| 2003/0007770 A1 * | 1/2003 | Matsumoto | G02B 6/3636 | 385/83 |
| 2003/0142946 A1 * | 7/2003 | Saito | G02B 6/30 | 385/137 |
| 2003/0152343 A1 * | 8/2003 | Yamada | G02B 6/3846 | 385/99 |
| 2003/0165305 A1 * | 9/2003 | Dallas | G02B 6/4251 | 156/325 |
| 2003/0185508 A1 * | 10/2003 | Fukuyama | G02B 6/262 | 385/33 |
| 2005/0041907 A1 * | 2/2005 | Fukuyama | G02B 6/4214 | 385/14 |
| 2005/0117847 A1 * | 6/2005 | Ono | G02B 6/30 | 385/49 |
| 2005/0129347 A1 * | 6/2005 | Saito | G02B 6/4471 | 385/14 |
| 2005/0201697 A1 * | 9/2005 | Tanaka | G02B 6/08 | 385/128 |
| 2006/0098920 A1 * | 5/2006 | Ono | G02B 6/30 | 385/71 |
| 2007/0025663 A1 * | 2/2007 | Kuroda | G02B 6/3636 | 385/49 |
| 2007/0122085 A1 * | 5/2007 | Takahashi | G02B 6/368 | 385/83 |
| 2007/0206909 A1 * | 9/2007 | Wetter | G02B 6/0218 | 385/92 |
| 2007/0292094 A1 * | 12/2007 | Nagasaka | G02B 6/4214 | 385/135 |
| 2008/0123198 A1 * | 5/2008 | Fujita | H01L 31/0203 | 257/E31.118 |
| 2008/0317416 A1 * | 12/2008 | Kurosawa | G02B 6/3861 | 385/78 |
| 2009/0003790 A1 * | 1/2009 | Sato | G02B 6/30 | 385/129 |
| 2009/0074362 A1 * | 3/2009 | Oba | G02B 6/2558 | 385/96 |
| 2009/0257718 A1 * | 10/2009 | Nishimura | G02B 6/3885 | 385/80 |
| 2009/0279827 A1 * | 11/2009 | Sano | G02B 6/43 | 156/305 |
| 2010/0202732 A1 * | 8/2010 | Sameshima | G02B 6/4201 | 385/39 |
| 2011/0033159 A1 * | 2/2011 | Kojima | G02B 6/4214 | 385/79 |
| 2011/0141862 A1 * | 6/2011 | Arai | G11B 5/4866 | |
| 2011/0142401 A1 * | 6/2011 | Lin | G02B 6/3817 | 385/77 |
| 2011/0242835 A1 * | 10/2011 | Masuko | G02B 6/4239 | 362/551 |
| 2011/0305417 A1 * | 12/2011 | Wang | G02B 6/3817 | 385/39 |
| 2012/0267796 A1 * | 10/2012 | Haba | H01L 25/0652 | 257/E23.079 |
| 2013/0136393 A1 * | 5/2013 | Ishii | G02B 6/428 | 385/14 |
| 2013/0163936 A1 * | 6/2013 | Ohta | G02B 6/3861 | 385/80 |
| 2014/0099058 A1 * | 4/2014 | Charbonneau-Lefort | G02B 6/4284 | 385/33 |
| 2014/0105543 A1 * | 4/2014 | de Jong | G02B 6/3885 | 29/428 |
| 2014/0193114 A1 * | 7/2014 | Ooba | G02B 6/42 | 385/14 |
| 2014/0193119 A1 * | 7/2014 | Isenhour | G02B 6/36 | 156/221 |
| 2015/0010282 A1 * | 1/2015 | Yokochi | G02B 6/4477 | 385/102 |
| 2015/0098241 A1 * | 4/2015 | Nakano | G02B 6/4263 | 362/581 |
| 2015/0198771 A1 * | 7/2015 | Nakama | G02B 6/3861 | 385/80 |
| 2015/0268425 A1 * | 9/2015 | de Jong | G02B 6/4214 | 385/33 |
| 2015/0301290 A1 * | 10/2015 | Fujiwara | G02B 6/3838 | 385/83 |
| 2016/0084733 A1 * | 3/2016 | Wu | G01M 11/083 | 29/458 |
| 2018/0217343 A1 * | 8/2018 | Matsumura | G02B 6/428 | |
| 2019/0121034 A1 | 4/2019 | Nagasaki et al. | | |
| 2020/0073066 A1 * | 3/2020 | Hirano | G02B 6/3652 | |
| 2020/0103613 A1 * | 4/2020 | Shen | H01L 27/14618 | |
| 2021/0048582 A1 * | 2/2021 | Uchiyama | G02B 6/2558 | |
| 2021/0093164 A1 * | 4/2021 | Iyoshi | A61B 1/00096 | |
| 2021/0132360 A1 * | 5/2021 | Ryoo | G03B 5/04 | |
| 2021/0157071 A1 * | 5/2021 | Shikama | G02B 6/4243 | |
| 2022/0128767 A1 * | 4/2022 | Evans | G02B 6/3882 | |
| 2022/0146774 A1 * | 5/2022 | Nagasaki | G02B 6/4486 | |
| 2022/0283388 A1 * | 9/2022 | Nagasaki | G02B 6/428 | |
| 2022/0404546 A1 * | 12/2022 | Krichevsky | G02B 6/421 | |
| 2022/0413229 A1 * | 12/2022 | Nakanishi | G02B 6/3644 | |
| 2023/0056098 A1 * | 2/2023 | Takahashi | H01S 5/4012 | |

\* cited by examiner

OPTICAL CONNECTOR CABLE

CROSS-REFERENCE TO RELATED APPLICATION

This application is based upon and claims the benefit of priority from Japanese Patent Application No. 2021-034557, filed on Mar. 4, 2021, the entire contents of which are incorporated herein by reference.

TECHNICAL FIELD

The present disclosure relates to an optical connector cable.

BACKGROUND

JP2019-078776 A discloses an optical connector cable including a holding member to hold a plurality of optical fibers and a lens component mounted on a circuit board. In this optical connector cable, tip end portions of the optical fibers are placed on a plurality of grooves provided in the lens component, and the tip end portions of the optical fibers are held down with a lid from above and fixed to the grooves.

SUMMARY

The present disclosure provides an optical connector cable. This optical connector cable includes a plurality of optical fibers, a lens module, and an adhesive portion. Each of the plurality of optical fibers extends in a first direction. The lens module includes a placement structure configured to place the plurality of optical fibers thereon in order in a second direction intersecting the first direction and a plurality of lenses optically coupled to tip ends of the plurality of optical fibers. The adhesive portion fixes the plurality of optical fibers to the placement structure with an adhesive. The adhesive portion includes a first adhesive portion located near the tip ends of the plurality of optical fibers and a second adhesive portion located behind the first adhesive portion in the first direction. The second adhesive portion has a Young's modulus higher than that of the first adhesive portion.

DETAILED DESCRIPTION

Problem to be Solved by the Present Disclosure

Figure 8:
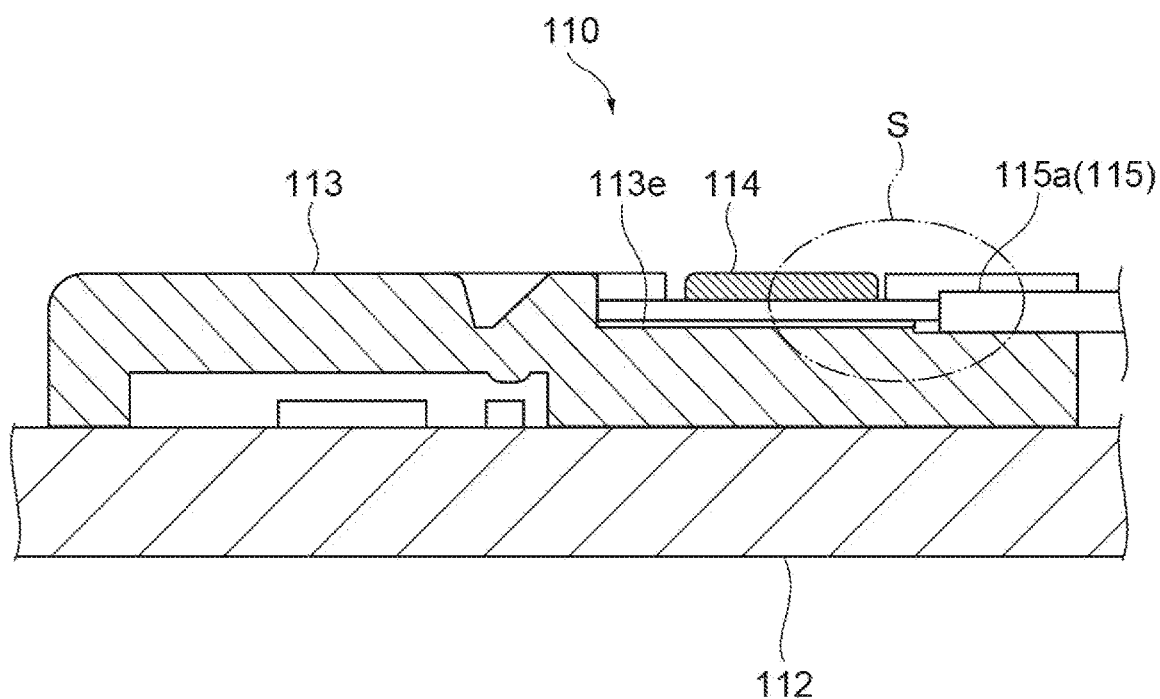
FIG. 8 is a cross-sectional view of a board assembly of an optical connector cable according to a comparative example when cut along the Y axis.
Figure 9:
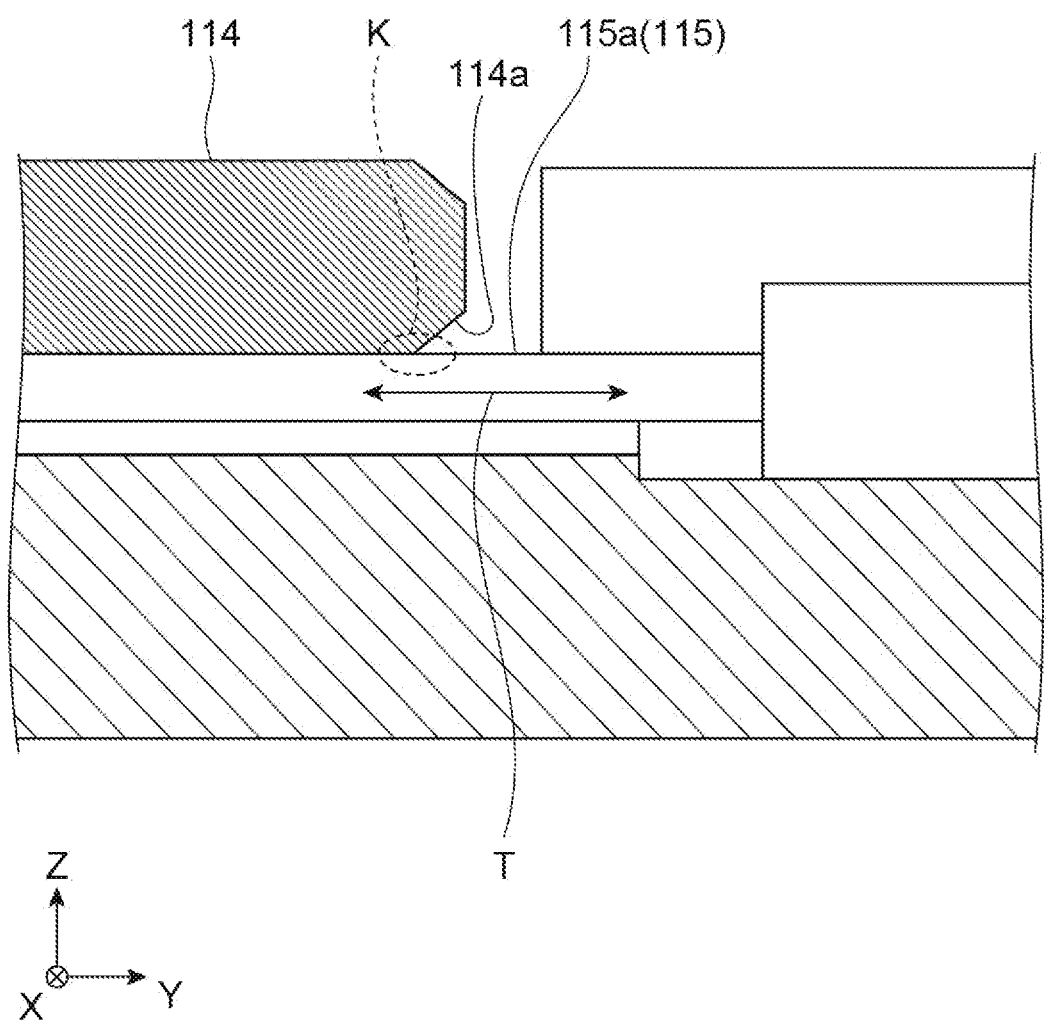
FIG. 9 is an enlarged cross-sectional view showing a region S of FIG. 8.

In an optical connector cable 110 of the related art, as shown in FIGS. 8 and 9, an exposed portion 115a of an optical fiber 115 which is exposed from a cable portion is placed on a groove 113e provided in a lens module 113 which is a lens component and is held down with a lid 114 from above, and then an adhesive is injected into a gap. As a result, the exposed portion 115a of the optical fiber 115 is fixed on the lens module 113. In such an optical connector cable, when the optical cable is strongly bent upward, a distance between a fiber fixed end of a holding member and a fiber fixed end of the lens module (an end portion 114a of the lid body 114) becomes short, and a force T in a compression direction is generated in the exposed portion 115a of the optical fiber 115. As a result, the exposed portion 115a of the optical fiber 115 may come into contact with the lid 114 or the like at the fiber fixed end of the holding member, and a minute scratch may be formed in a scratch generation region K of the exposed portion 115a of the optical fiber. On the other hand, when the optical cable is strongly bent downward, the distance between the fiber fixed end of the holding member and the fiber fixed end of the lens module 113 becomes long, and a force T in a tensile direction is generated in the exposed portion 115a of the optical fiber 115. As a result, if the exposed portion 115a of the optical fiber 115 has a scratch, the scratch may further progress. If such bending in upward and downward directions continues for a long time, there is a possibility that the exposed portion 115a of the optical fiber 115 may be broken.

Effects of the Present Disclosure

According to the present disclosure, it is possible to provide an optical connector cable that is resistant to bending of a cable portion.

Description of Embodiments of the Present Disclosure

First, the content of embodiments of the present disclosure will be listed and described. An optical connector cable according to an embodiment includes a plurality of optical fibers, a lens module, and an adhesive portion. Each of the plurality of optical fibers extends in a first direction. The lens module includes a placement structure configured to place the plurality of optical fibers thereon in order in a second direction intersecting the first direction and a plurality of lenses optically coupled to tip ends of the plurality of optical fibers. The adhesive portion fixes the plurality of optical fibers to the placement structure with an adhesive. The adhesive portion includes a first adhesive portion located near the tip ends of the plurality of optical fibers and a second adhesive portion located behind the first adhesive portion in the first direction. The second adhesive portion has a Young's modulus higher than that of the first adhesive portion.

In this optical connector cable, the second adhesive portion located behind the first adhesive portion has a Young's modulus higher than that of the first adhesive portion located near the tip ends of the plurality of optical fiber. That is, the second adhesive portion which is a portion to fix the optical fiber on the rear is in a hard state. In the optical connector cable, even if bending in the upward and downward directions is applied to the cable portion in which the optical fibers are integrated, the second adhesive portion made of a hard material blocks a compressive stress and a tensile stress transmitted to the exposed portion of the optical fiber due to the bending. As a result, the exposed portion of the optical fiber is not scratched or the scratch does not progress, and thus breakage of the exposed portion of the optical fiber is suppressed. Therefore, it is possible to provide an optical connector cable that is resistant to the bending of the cable portion.

As an embodiment, the second adhesive portion may be formed of an adhesive having a Young's modulus of 400 MPa or more. The Young's modulus shown here indicates a value after curing of the adhesive. In this case, even if the bending applied to the cable portion of the optical connector cable becomes stronger, the compressive stress and the tensile stress due to the bending are more reliably blocked by the harder second adhesive portion. As a result, it is possible to provide an optical connector cable that is more resistant to the bending of the cable portion.

As an embodiment, the first adhesive portion may be formed of an acrylic-based adhesive, and the second adhesive portion may be formed of an epoxy-based adhesive. In a case where the first adhesive portion near the tip ends (adjacent to the lens) of the optical fibers is formed of an acrylic-based adhesive, since the acrylic-based adhesive is a relatively soft material, positional deviation and the like can be suppressed even if there are thermal expansion and subsequent thermal contraction and the like in portions near the tip ends of the optical fibers. That is, the optical connector cable can be made environmentally resistant. On the other hand, in a case where the second adhesive portion on the rear is formed of an epoxy-based adhesive, the second adhesive portion can be a fixed portion that is hard and has high mechanical strength. Therefore, it is possible to more reliably protect the exposed portions of the optical fibers from the stress due to the bending of the cable portion. According to this embodiment, it is possible to achieve both environmental resistance and mechanical strength of the optical connector cable.

As an embodiment, the optical connector cable may further include a lid covering at least a part of the plurality of optical fibers placed on the placement structure. At least a part of the first adhesive portion may be located between the lid and the placement structure, and at least a part of the second adhesive portion may be located behind the lid in the first direction. In this case, the second adhesive portion can be reliably disposed in a proximity region of the cable portion, and the second adhesive portion can more reliably block the compressive stress and the tensile stress due to the bending of the cable portion. As a result, breakage or the like of the exposed portion including the tip end of each optical fiber is more reliably suppressed, and thus it is possible to provide an optical connector cable that is more resistant to the bending of the cable portion.

As an embodiment, the lid may be a light transmitting member, and an adhesive forming at least one of the first adhesive portion and the second adhesive portion may be a photocurable adhesive. In this case, solidification (curing) work of the adhesive used for the first adhesive portion or the second adhesive portion can be easily performed. Further, the solidification work of the adhesive used for the first adhesive portion or the second adhesive portion can also be performed more reliably.

As an embodiment, the optical connector cable may further include a holding member having an end surface from which the plurality of optical fibers protrude and collectively holding the plurality of optical fibers; and a circuit board on which the lens module and the holding member are mounted. The holding member may be fixed to the circuit board with a third adhesive portion having a Young's modulus higher than that of the first adhesive portion. In this case, the holding member is more firmly fixed to the circuit board with the third adhesive portion, and even if the bending in the upward and downward directions is applied to the cable portion, the holding member absorbs the compressive stress or the tensile stress due to the bending. Therefore, the stress transmitted to the exposed portions of the optical fibers can be reduced. As a result, breakage or the like of the exposed portion of each optical fiber is more reliably suppressed, and thus it is possible to provide an optical connector cable that is more resistant to the bending of the cable portion.

As an embodiment, an adhesive forming the third adhesive portion may be the same type of adhesive as the adhesive forming the second adhesive portion. In this case, it is not necessary to prepare many types of adhesives, and the manufacturing of the optical connector cable can be simplified.

As an embodiment, the holding member and the lens module may be separated from each other, and the plurality of optical fibers may be in a deformable state in the separated region. In this case, even if the bending in the upward and downward directions is applied to the cable portion, the exposed portions of the optical fibers located in the separated region are in a deformable state, and thus it is possible for the exposed portions of the optical fibers to perform a movement to escape the compressive stress or the tensile stress due to the bending. As a result, breakage or the like of the exposed portion including the tip end of each optical fiber is more reliably suppressed, and thus it is possible to provide an optical connector cable that is more resistant to the bending of the cable portion.

Details of Embodiments of the Present Disclosure

Specific examples of the optical connector cable according to the present disclosure will be described below with reference to the drawings. The present invention is not limited to these examples, but is defined by the scope of the claims, and is intended to include meanings equivalent to the scope of the claims and all modifications within the scope. In the description of the drawings, the same elements will be denoted by the same reference signs, and duplicate description will be omitted.

Figure 1:
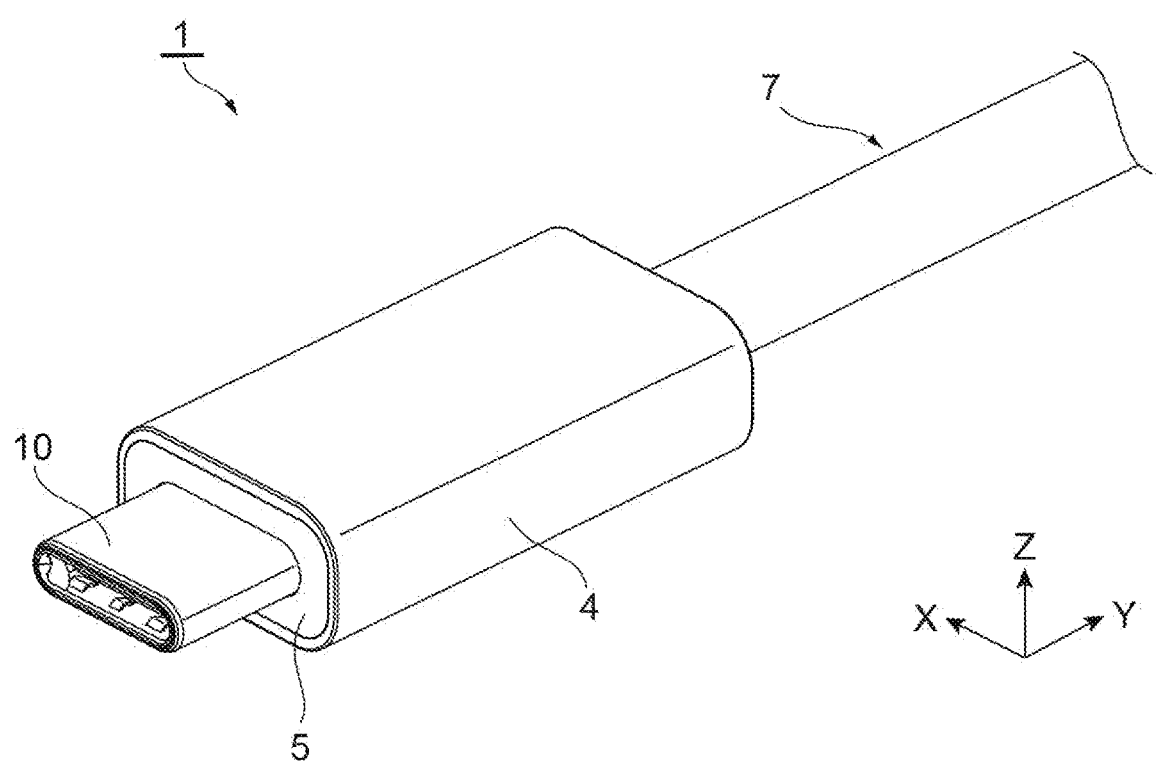
FIG. 1 is a perspective view showing an optical connector cable according to an embodiment.
Figure 2:
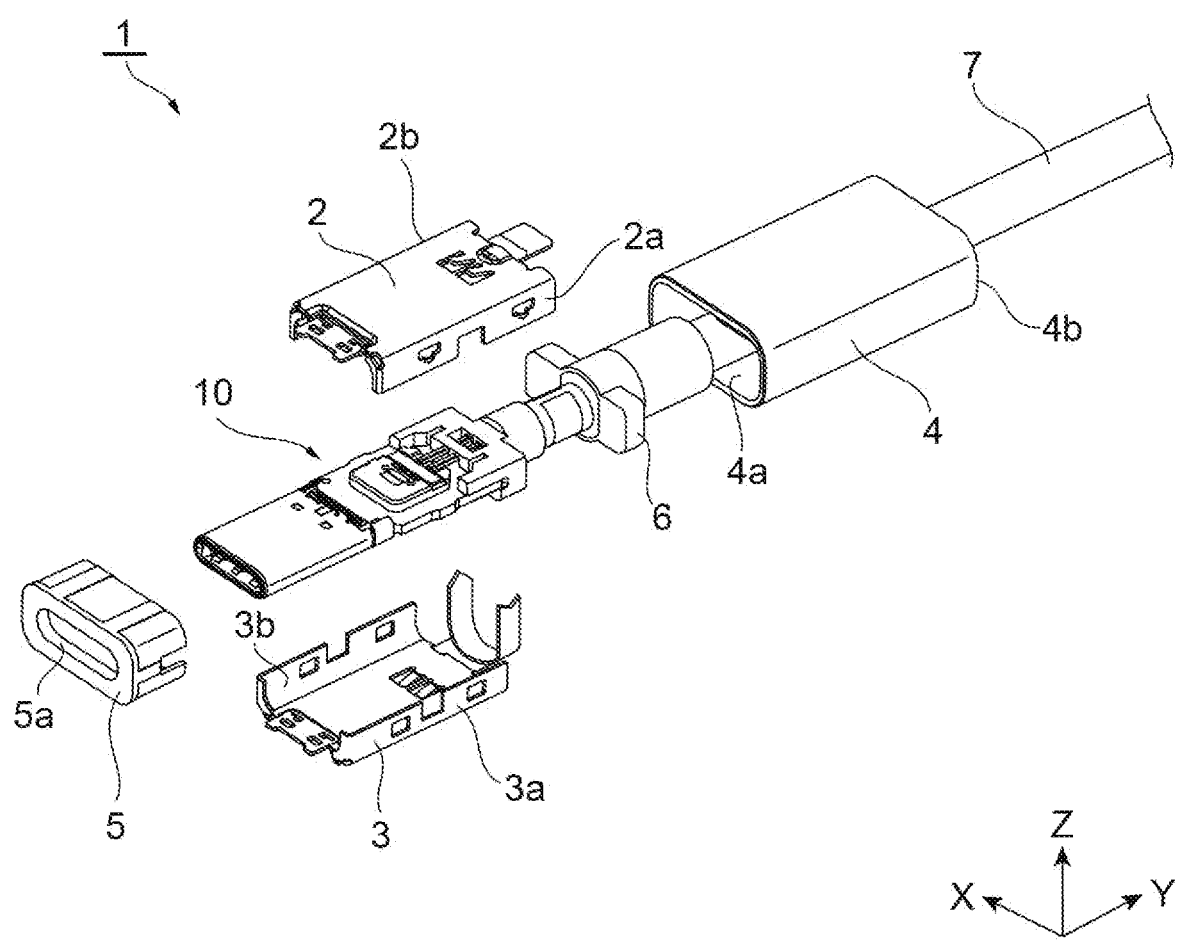
FIG. 2 is an exploded perspective view of the optical connector cable shown in FIG. 1.

An optical connector cable 1 according to an embodiment will be described with reference to FIGS. 1 and 2. FIG. 1 is a perspective view showing an optical connector cable according to an embodiment. FIG. 2 is an exploded perspective view of the optical connector cable shown in FIG. 1. The optical connector cable 1 is, for example, a cable used for transmitting and receiving an optical signal and an electric signal between devices, may be, for example, an active optical cable (AOC), and may be a cable having a plug size compliant with a USB Type-C standard. Although one end of the optical connector cable 1 is shown in FIGS. 1 and 2, the other end of the optical connector cable 1 may have the same configuration or may have another configuration.

As shown in FIGS. 1 and 2, the optical connector cable 1 includes metal shells 2 and 3, a boot 4, a cap 5, a strain relief 6, an optical fiber cable 7, and a board assembly 10. In the following description, a width direction of the board assembly 10 is a direction X, an extending direction of the board assembly 10 is a direction Y, and a thickness direction of the board assembly 10 is a direction Z. In the present embodiment, the direction X, the direction Y, and the direction Z are orthogonal to each other. In the following description, a tip end of the optical connector cable 1 (the board assembly 10) may be referred to as a front and an opposite to the tip end thereof in the direction Y may be referred to as a rear.

The metal shells 2 and 3 are case members that house the board assembly 10 inside to protect it and also function as shield members. The metal shells 2 and 3 are formed of a metal such as SUS. The metal shell 2 has a pair of side walls 2a and 2b extending in the direction Y, and the metal shell 3 has a pair of side walls 3a and 3b extending in the direction Y. When engagement protrusions provided on the side walls 2a and 2b are inserted into openings provided on the side walls 3a and 3b, the metal shell 2 engages with the metal shell 3.

The boot 4 is a member disposed on an outer periphery of the metal shells 2 and 3 that house the board assembly 10 therein. The boots 4 are formed of, for example, a resin or a metal. The boot 4 is a tubular member and is formed in a substantially rectangular shape in a cross-sectional view. A thickness of the boot 4 in the direction Z is, for example, 6.5 mm or less. A substantially rectangular opening 4a is provided at a front end of the boot 4, and a rear side wall 4b is provided at a rear end. The rear side wall 4b has a circular hole, and a tubular portion of the strain relief 6 on a rear end can be inserted into the hole.

The cap 5 is a member attached to the opening 4a of the boot 4. The cap 5 has an opening 5a having a shape corresponding to an outer shape of a connector 11 of the board assembly 10. In an assembled state of the optical connector cable 1, a tip end portion of the connector 11 is disposed to protrude from an opening 5a of the cap 5 to the outside of the boot 4.

The strain relief 6 is a member for fixing the optical fiber cable 7 to the board assembly 10 at one end. The strain relief 6 is fixed to the board assembly 10 housed in the metal shells 2 and 3. The optical fiber cable 7 is a cable that collectively houses a plurality of optical fibers 15 (see FIG. 3), which will be described later. The optical fiber cable 7 may house one or more electric wires for transmitting an electric signal or the like together with the optical fibers 15.

Figure 3:
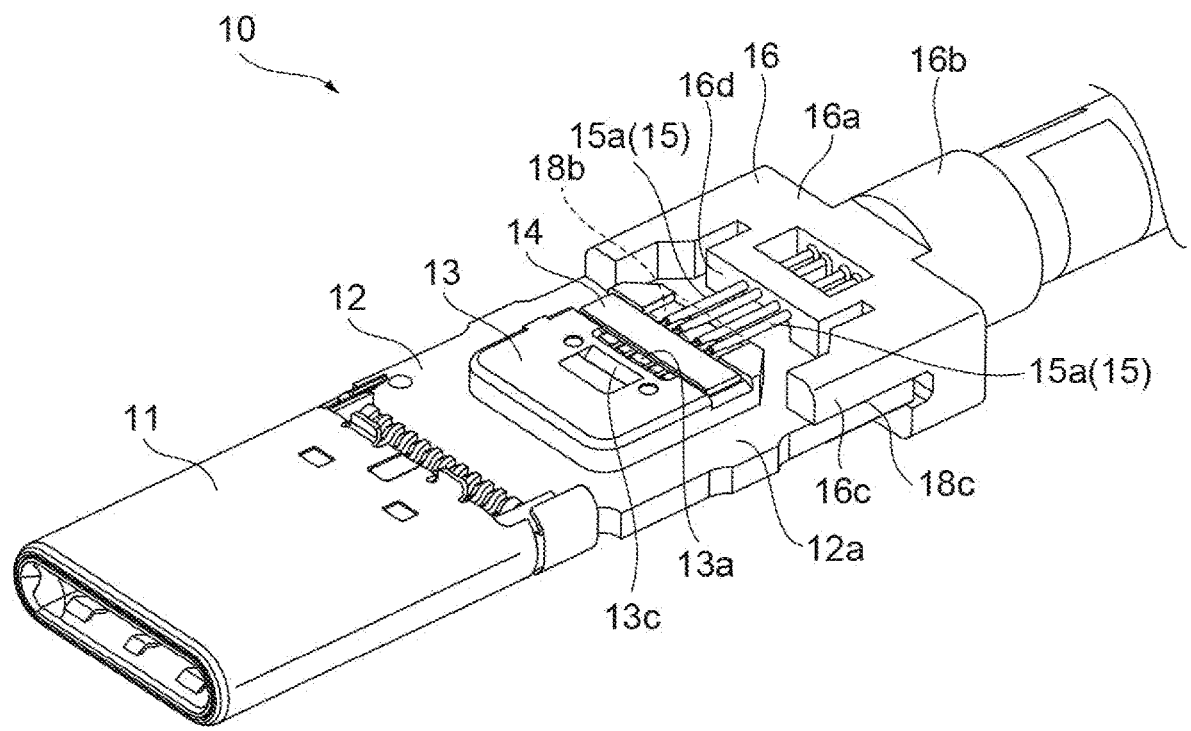
FIG. 3 is a perspective view showing a board assembly of the optical connector cable shown in FIG. 1.
Figure 4:
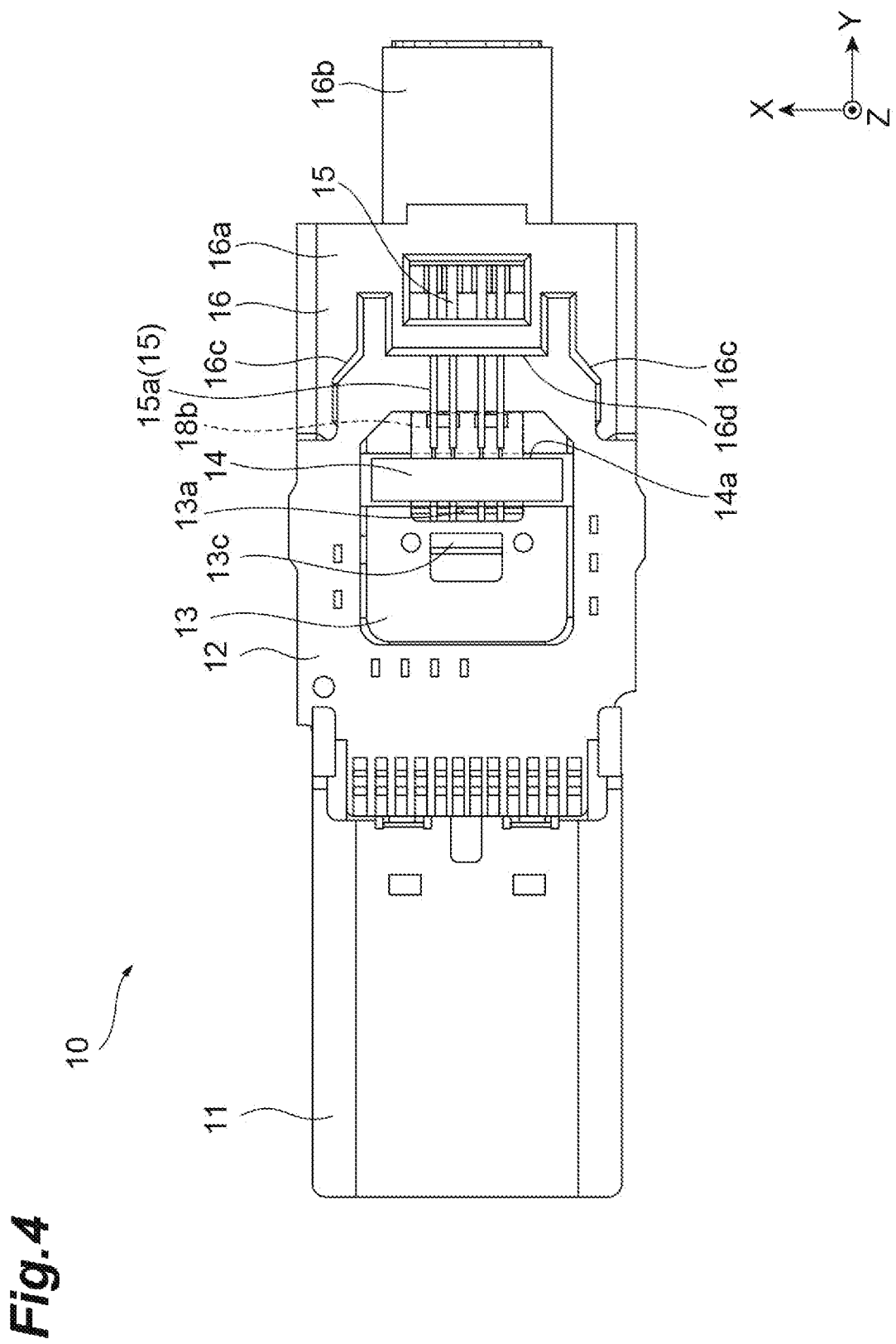
FIG. 4 is a plan view of the board assembly shown in FIG. 3 from above.

The board assembly 10 is a module which is connected to one end portion of the optical fiber cable 7 and has a function of converting an optical signal from the optical fiber cable 7 into an electric signal to output it to the outside and converting an electric signal from the outside into an optical signal to output it to the optical fiber cable 7. In a case where the optical fiber cable 7 has an electric wire, the board assembly 10 is configured such that the electric wire is also connected thereto to transmit and receive an electric signal to and from the outside. FIG. 3 is a perspective view showing the board assembly 10. FIG. 4 is a plan view of the board assembly 10 from above. As shown in FIGS. 3 and 4, the board assembly 10 includes the connector 11, a circuit board 12, a lens module 13, a lid 14, optical fibers 15, and a holding member 16.

The connector 11 is a member having a flat shape and is attached to an end portion of the circuit board 12. The connector 11 has a size and a shape to be inserted into a socket provided in a device to which the optical connector cable 1 is connected. An optical signal transmitted from the optical fiber cable 7 is converted into an electric signal by a photoelectric conversion element 17 (see FIG. 7) mounted on the circuit board 12, and the connector 11 sends the electric signal to an external device. Further, the connector 11 sends an electric signal from the external device to the photoelectric conversion element 17.

The circuit board 12 is a plate-shaped member on which various optical elements and electronic elements are mounted and built in. The circuit board 12 may be, for example, a thin board having a thickness of 0.2 mm or more and 1.0 mm or less in the direction Z. The circuit board 12 is formed in a substantially rectangular shape in a plan view and is disposed such that its longitudinal direction is the direction Y. A width of the circuit board 12 in the longitudinal direction may be, for example, 12 mm or more and 16 mm or less. Various wirings for electrically connecting ICs, electronic elements, and the like may be provided on a surface and the inside of the circuit board 12. The wirings included in the circuit board 12 may be electrically connected to a plurality of electric wires included in the optical fiber cable 7.

The lens module 13 is a plate-shaped component placed on the circuit board 12, and is an optical member that optically couples a plurality of optical fibers 15 of the optical fiber cable 7 with photoelectric conversion elements 17 mounted on the circuit board 12. The lens module 13 has a placement structure 13a configured such that exposed portions 15a of the plurality of optical fibers 15 which are exposed from a cable portion are placed thereon in order in the X direction, a plurality of lenses 13b optically coupled to tip ends of the optical fibers 15 (see FIG. 7), a mirror 13c provided on optical paths between the tip ends of the optical fibers 15 and the plurality of lenses 13b, and a housing space 13d for housing the photoelectric conversion elements 17 (see FIG. 7). The photoelectric conversion element 17 is an element that photoelectrically converts light incident from the corresponding optical fiber 15 or light emitted to the corresponding optical fiber 15. The photoelectric conversion element may be, for example, a light receiving element such as a photodiode (PD) or a light emitting element such as a vertical cavity surface emitting laser (VCSEL). The photoelectric conversion elements 17 are provided at positions where they overlap a plurality of lenses 13b of the lens module 13 in the thickness direction of the circuit board 12. Light L emitted from the tip ends of the optical fibers 15 in a horizontal direction (a Y direction) is converted into light propagating in a vertical direction (a Z direction) by the mirror 13c of the lens module 13. After that, the light is condensed by the plurality of lenses 13b and is incident on the photoelectric conversion elements 17. Further, light L emitted from the photoelectric conversion elements 17 in the vertical direction (the Z direction) is converted into light propagating in the horizontal direction (Y direction) by the mirror 13c included in the lens module 13 via the plurality of lenses 13b. After that, the light is incident on the optical fibers 15. At least a part of the lens module 13 is made of a transparent material (for example, glass or the like) through which light can propagate.

Figure 5:
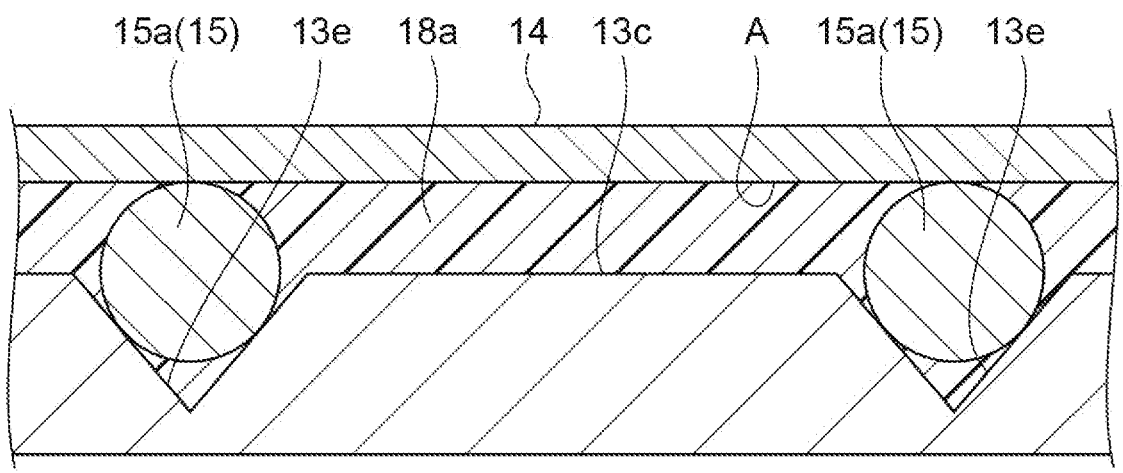
FIG. 5 is a cross-sectional view showing a state in which optical fibers placed in V grooves are held down with a glass lid.

The placement structure 13a of the lens module 13 includes a plurality of grooves 13e each extending in the direction Y. The plurality of grooves 13e are provided in order in the direction X to be parallel to each other, for example. The plurality of grooves 13e are, for example, V grooves, and the exposed portions 15a of the optical fibers 15 are disposed thereon. Since the exposed portion 15a of the optical fiber 15 is housed in each groove 13e, the movement of the exposed portion 15a in an XY direction is restricted. After the exposed portion 15a of the optical fiber 15 is housed in each groove 13e, the lid 14 lies from above such that the lid 14 covers a part of the exposed portions 15a and is held down (see FIG. 5). As a result, the movement of the exposed portions 15a of the optical fibers 15 in the Z direction is fixed. As shown in FIG. 5, an adhesive, which will be described later, is injected into a gap A between the grooves 13e, the lid 14, and the exposed portions 15a of the optical fibers. As a result, for example, a first adhesive portion 18a and the like are formed.

The lid 14 is a plate-shaped member that holds down the exposed portions 15a of the optical fibers 15 placed in the placement structure 13a from above. The lid 14 is made of, for example, a light transmitting member such as glass. The lid 14 may be made of another material.

The optical fiber 15 is, for example, a glass fiber constituted by a core and a cladding surrounding the core and is formed by being coated with a resin. The exposed portion 15a of the optical fiber 15 includes a coated portion 15b that is opened from the cable portion and is coated immediately after protruding from the holding member 16 and a coating removed portion 15c from which the coating is removed near a tip end thereof. Each optical fiber 15 may be a single mode optical fiber (SMF) or a multimode optical fiber (MMF). In the present embodiment, the optical fiber cable 7 includes four optical fibers 15, but the number of optical fibers 15 is not limited.

The holding member 16 is a member that collectively holds the plurality of optical fibers 15. The holding member 16 is a member made of, for example, a resin and includes a main body portion 16a, a cylindrical portion 16b, a pair of protruding portions 16c, and a reference end surface 16d. The exposed portions 15a of the optical fibers 15 protrude from the reference end surface 16d. The holding member 16 can be manufactured, for example, by resin molding with the plurality of optical fibers 15 disposed in a mold. The cylindrical portion 16b is a member having a cylindrical shape and houses the plurality of optical fibers 15 therein. The main body portion 16a is a member having a substantially rectangular parallelepiped shape and houses the plurality of optical fibers 15 together with the cylindrical portion 16b. Inside the main body portion 16a and the cylindrical portion 16b, an arrangement aspect of the plurality of optical fibers 15 changes. Specifically, inside the cylindrical portion 16b, the plurality of optical fibers 15 are closely arranged with each other in a bundle, but inside the main body portion 16a, the plurality of optical fibers 15 are separated from each other as they are directed toward the tip end to change to an arrangement aspect in which they are arranged one-dimensionally in the direction X.

The pair of protruding portions 16c are members that protrude from a surface of the main body portion 16a toward the tip end in the direction Y. As shown in FIGS. 1 and 3, when the optical fiber cable 7 is fixed to the board assembly 10, lower surfaces of the pair of protruding portions 16c are placed on a main surface 12a of the circuit board 12. That is, the pair of protruding portions 16c are used for positioning the optical fiber cable 7 with respect to the circuit board 12 in the direction Z. The lower surfaces of the pair of protruding portions 16c and the main surface 12a of the circuit board 12 may be fixed to each other with, for example, an adhesive (a third adhesive portion 18c). The adhesive used here may be the same type of adhesive as an adhesive forming a second adhesive portion 18b which will be described later.

The reference end surface 16d is a surface provided between the pair of protruding portions 16c and extends in the direction X and the direction Z. The exposed portions 15a of the plurality of optical fibers 15 protrude from the reference end surface 16d toward the tip end. An extending direction of the exposed portions 15a of the optical fibers 15 protruding from the reference end surface 16d and an extending direction of the reference end surface 16d may form, for example, a right angle. The above-mentioned members (the main body portion 16a, the cylindrical portion 16b, and the pair of protruding portions 16c) constituting the holding member 16 may be integrally formed by injection molding a resin (for example, a polyamide resin or the like).

Next, with reference to FIGS. 6 and 7, an embodiment in which the exposed portions 15a of the optical fibers 15 are bonded and fixed to the placement structure 13a (the grooves 13e) of the lens module 13 with a plurality of types of adhesives will be described.

In the optical connector cable 1, the exposed portions 15a of the optical fibers 15 are placed in the plurality of grooves 13e of the placement structure 13a of the lens module 13 of the board assembly 10, and optical adjustment is performed, and then the exposed portions 15a are held down with the lid 14 from above. As shown in FIGS. 6 and 7, in this holding-down configuration, a region between the placement structure 13a and the lid 14 and a region in the placement structure 13a which is not covered with the lid 14 (a region in front of the lid 14 in the direction Y and a region behind the lid 14 in the direction Y) are provided with an adhesive portion 18 by injecting adhesives for fixing the exposed portions 15a of the optical fibers 15 to the placement structure 13a or the like. In FIG. 6, for example, the adhesive portion 18 is shown by a dotted line. In the present embodiment, the adhesive portion 18 is made of a cured product of two types of adhesives and has a first adhesive portion 18a located near the tip ends of the optical fibers 15 (adjacent to the plurality of lenses 13b) and a second adhesive portion 18b located behind the adhesive portion 18a (adjacent to the holding member 16).

The first adhesive portion 18a is a portion for bonding and fixing the exposed portions 15a of the optical fibers 15 to the placement structure 13a with the lid 14. The first adhesive portion 18a fixes, for example, the coating removed portions 15c of the optical fibers 15 with the adhesive. The first adhesive portion 18a is a thin layered portion formed of, for example, an acrylic-based adhesive. An acrylic-based adhesive is injected into the gap between the placement structure 13a, the exposed portions 15a of the optical fibers, and the lid 14 (see FIG. 5) and then is cured with light, heat, or the like. As a result, the first adhesive portion 18a is formed. The first adhesive portion 18a is formed, for example, in a region between the placement structure 13a and the lid 14, or in a region in front of the lid 14 (adjacent to the lens 13b or the mirror 13c) in the placement structure 13a. The first adhesive portion 18a can be made of an adhesive material that is more resistant to thermal expansion and thermal contraction than the second adhesive portion 18b. A rear end 14a of the lid 14 is located at the coating removed portions 15c in a plan view, and this portion of the coating removed portions 15c is covered by the first adhesive portion 18a.

The second adhesive portion 18b is a portion for bonding and fixing the exposed portions 15a of the optical fibers 15 to the placement structure 13a behind the first adhesive portion 18a. The second adhesive portion 18b fixes, for example, rear ends of the coating removed portions 15c of the optical fibers 15 and the coated portions 15b with the adhesive. The second adhesive portion 18b is a thin layered portion formed of, for example, an epoxy-based adhesive. An epoxy-based adhesive is injected into a region of the placement structure 13a where the exposed portions 15a are disposed and the lid 14 is not disposed and a region behind this region, and then is cured with light, heat, or the like. As a result, the second adhesive portion 18b is formed. The second adhesive portion 18b is formed, for example, behind the lid 14 (in a region between the lid 14 and the reference end surface 16d of the holding member 16). The second adhesive portion 18b may be formed such that the surface thereof is above the first adhesive portion 18a by a thickness of the lid 14. The second adhesive portion 18b can be made of a material having a Young's modulus higher than that of the first adhesive portion 18a. More specifically, the second adhesive portion 18b can be made of a material having a Young's modulus of 400 MPa or more. The Young's modulus referred to here indicates a value after curing of each adhesive. Both adhesives may be collectively cured with light, heat or the like after the adhesive forming the first adhesive portion 18a and the adhesive forming the second adhesive portion 18b are injected into predetermined locations.

Figure 6:
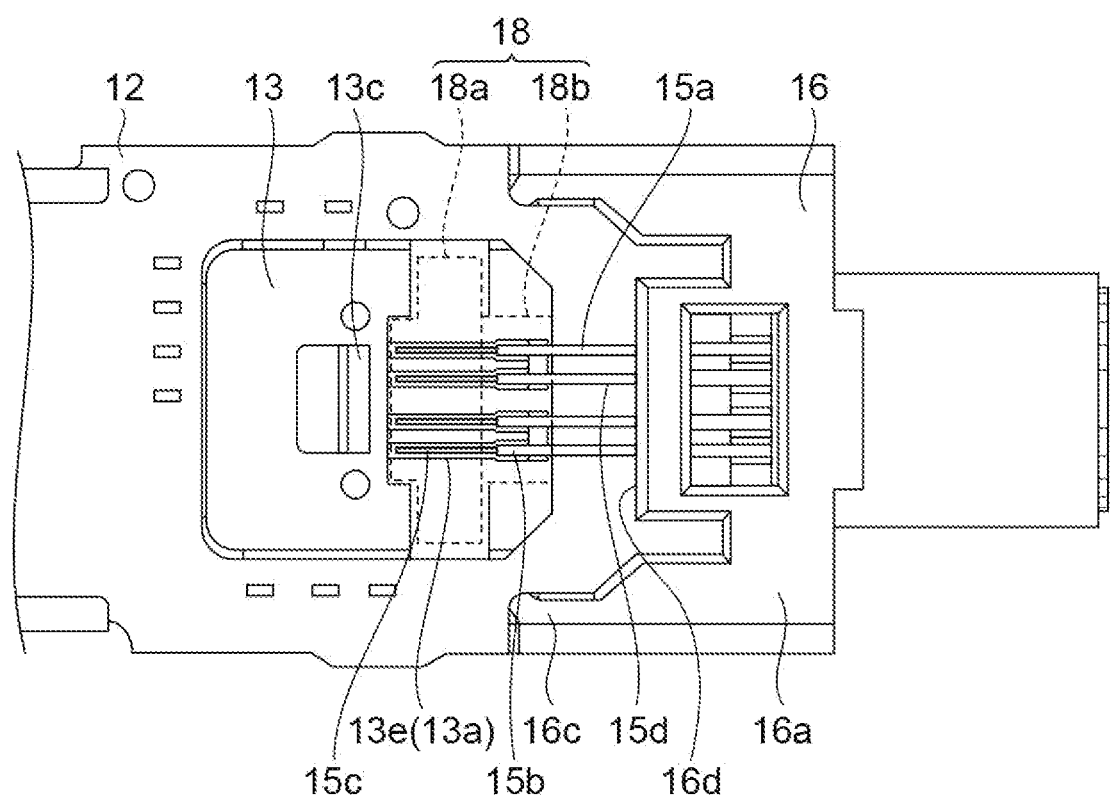
FIG. 6 is a plan view for explaining a disposition status of an adhesive portion in the board assembly shown in FIG. 3.
Figure 6:
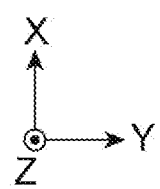
Figure 7:
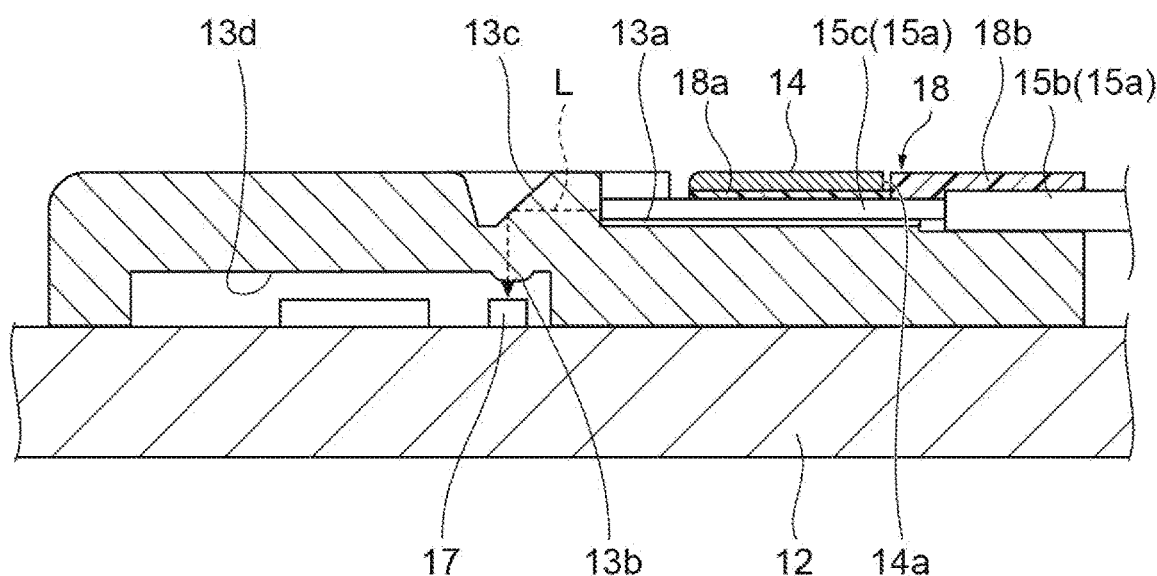
FIG. 7 is a cross-sectional view of the board assembly shown in FIG. 6 when cut along a Y axis.
Figure 7:
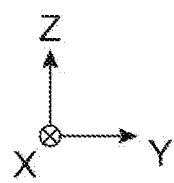

Further, in this adhesive configuration, as shown in FIG. 6, no adhesive or the like is injected between the second adhesive portion 18b and the holding member 16, and a void is formed. That is, parts 15d of the exposed portions 15a of the optical fibers 15 are not fixed with the adhesive and are in a deformable state (a free state). The main body portion 16a and the pair of protruding portions 16c of the holding member 16 may be bonded and fixed to the circuit board 12 with the third adhesive portion 18c formed of an adhesive of the same type as the first adhesive portion 18a (for example, an acrylic-based adhesive), or may be bonded and fixed to the circuit board 12 with the third adhesive portion 18c formed of an adhesive of the same type as the second adhesive portion 18b (for example, an epoxy-based adhesive). Preferably, the holding member 16 may be bonded and fixed to the circuit board 12 with an adhesive of the same type as the second adhesive portion 18b (for example, an epoxy-based adhesive).

As described above, in the optical connector cable 1 according to the present embodiment, the second adhesive portion 18b located behind the first adhesive portion 18a has a Young's modulus higher than that of the first adhesive portion 18a located near the tip ends of the optical fibers 15. That is, the second adhesive portion 18b which is a portion for fixing the optical fibers 15 on the rear (adjacent to the holding member 16) has a hard structure. Therefore, in the optical connector cable 1, even if bending in the upward and downward directions is applied to the cable portion (a basic portion of the optical fiber cable 7 or the like) in which the optical fibers 15 are integrated, the second adhesive portion 18b made of a hard material blocks a compressive stress and a tensile stress transmitted to the exposed portions 15a of the optical fibers 15 due to the bending. As a result, the exposed portions 15a of the optical fibers 15 are not scratched or the scratch does not progress, and thus breakage of the exposed portions 15a of the optical fibers 15 is suppressed. Therefore, it is possible to provide an optical connector cable that is resistant to the bending of the cable portion.

In the optical connector cable 1 according to the present embodiment, the second adhesive portion 18b may be formed of an adhesive having a Young's modulus of 400 MPa or more after curing. In this case, even if the bending applied to the cable portion of the optical connector cable 1 becomes stronger, the compressive stress and the tensile stress due to the bending are more reliably blocked by the harder second adhesive portion 18b. As a result, it is possible to provide an optical connector cable that is more resistant to the bending of the cable portion.

In the optical connector cable 1 according to the present embodiment, the first adhesive portion 18a may be formed of an acrylic-based adhesive, and the second adhesive portion 18b may be formed of an epoxy-based adhesive. In a case where the first adhesive portion 18a near the tip ends (adjacent to the lens 13b) of the optical fibers 15 is formed of an acrylic-based adhesive, since the acrylic-based adhesive is a relatively soft material, positional deviation and the like can be suppressed even if there are thermal expansion and subsequent thermal contraction and the like in the exposed portions 15a near the tip ends of the optical fibers 15. That is, the optical connector cable 1 can be made environmentally resistant. On the other hand, in a case where the second adhesive portion 18b near the rear (adjacent to the holding member 16) is formed of an epoxy-based adhesive, the second adhesive portion 18b can be a fixed portion that is hard and has high mechanical strength. Therefore, it is possible to more reliably protect the exposed portions 15a of the optical fibers 15 from the stress due to the bending of the cable portion. According to this aspect, it is possible to achieve both environmental resistance and mechanical strength of the optical connector cable.

The optical connector cable 1 according to the present embodiment further includes the lid 14 covering at least a part of the plurality of optical fibers 15 placed on the placement structure. At least a part of the first adhesive portion 18a is located between the lid 14 and the placement structure 13a, and at least a part of the second adhesive portion 18b is located behind the lid 14. Therefore, the second adhesive portion 18b can be reliably disposed in a proximity region of the cable portion, and the second adhesive portion 18b can more reliably block the compressive stress and the tensile stress due to the bending of the cable portion. As a result, breakage or the like of the exposed portion of each optical fiber is more reliably suppressed, and thus it is possible to provide an optical connector cable that is more resistant to the bending of the cable portion.

In the optical connector cable 1 according to the present embodiment, the lid 14 may be a light transmitting member, and the adhesive forming at least one of the first adhesive portion 18a and the second adhesive portion 18b may be a photocurable adhesive. In this case, solidification (curing) work of the adhesive used for the first adhesive portion 18a or the second adhesive portion 18b can be easily performed. Further, the solidification work of the adhesive used for the first adhesive portion 18a or the second adhesive portion 18b can also be performed more reliably.

The optical connector cable 1 according to the present embodiment includes the holding member 16 that has the reference end surface 16d from which the plurality of optical fibers 15 protrude and collectively holds the plurality of optical fibers 15, and a circuit board 12 on which the lens module 13 and the holding member 16 are mounted. The holding member 16 may be fixed to the circuit board 12 with the adhesive portion having a Young's modulus higher than that of the first adhesive portion 18a. In this case, the holding member 16 is more firmly fixed to the circuit board 12 with this adhesive portion, and even if the bending in the upward and downward directions is applied to the cable portion, the holding member 16 absorbs the compressive stress or the tensile stress due to the bending. Therefore, the stress transmitted to the exposed portions 15a of the optical fibers 15 can be reduced. As a result, breakage or the like of the exposed portion of each optical fiber is more reliably suppressed, and thus it is possible to provide an optical connector cable that is more resistant to the bending of the cable portion.

In the optical connector cable 1 according to the present embodiment, the adhesive forming the adhesive portion between the circuit board 12 and the holding member 16 may be the same type of adhesive as the adhesive forming the second adhesive portion 18*b*. In this case, it is not necessary to prepare many types of adhesives, and the manufacturing of the optical connector cable can be simplified.

In the optical connector cable 1 according to the present embodiment, the holding member 16 and the lens module 13 are separated from each other, and the parts 15*d* of the exposed portions 15*a* of the plurality of optical fibers 15 are in a deformable state in the separated region. Therefore, even if the bending in the upward and downward directions is applied to the cable portion, the parts 15*d* of the exposed portions 15*a* of the optical fibers 15 located in the separated region are in a deformable state, and thus it is possible for the exposed portions 15*a* of the optical fibers to perform a movement to escape the compressive stress or the tensile stress due to the bending. As a result, the breakage or the like of the exposed portion 15*a* of each optical fiber is more reliably suppressed, and thus it is possible to provide an optical connector cable that is more resistant to the bending of the cable portion.

Although the embodiment according to the present disclosure is described in detail above, the present invention is not limited to the above embodiment and can be applied to various embodiments. In the above-described embodiment, the second adhesive portion 18*b* is provided behind the lid 14, but a part of the second adhesive portion 18*b* may be inserted between the placement structure 13*a* and the lid 14. On the contrary, the first adhesive portion 18*a* may be configured to protrude rearward from the lid 14. Further, in the above embodiment, the configuration is such that two adhesive portions of the first adhesive portion 18*a* and the second adhesive portion 18*b* are provided, but a configuration in which three or more adhesive portions are provided may be possible. In this case, the Young's modulus of the adhesive portion at the rear of the optical connector cable, that is, the adhesive portion near the holding member 16, may be higher than that of the adhesive portion at the front of the optical connector cable.

In the above-described embodiment, a void is provided between the adhesive portion 18 and the holding member 16, and a free portion is provided in the exposed portions 15*a* of the optical fibers 15, but the space between the adhesive portion 18 and the holding member 16 may be filled with another adhesive without providing such a free portion. Further, although the optical connector cable 1 according to the above embodiment is configured to include the lid 14, it may be configured not to have the lid 14. In this case, the first adhesive portion 18*a* may be provided in a region corresponding to the lid 14 and in front of the region, and the second adhesive portion 18*b* may be provided behind the region corresponding to the lid 14.

In the above-described embodiment, the optical connector cable 1 is configured using the holding member 16, but the optical fibers 15 from the optical fiber cable 7 may be configured to be directly placed in the placement structure 13*a* without using the holding member 16. In this configuration, the exposed portions of the optical fibers 15 released from the optical fiber cable 7 are fixed to the placement structure with the first adhesive portion 18*a* and the second adhesive portion 18*b* as in the above embodiment. Further, a free region in which the optical fibers 15 are not fixed with the adhesive may be provided between the second adhesive portion 18*b* and an open end of the optical fiber cable 7 (the end portion where the optical fiber is exposed from a cable sheath). In this region, parts of the exposed portions 15*a* of the optical fibers 15 are in a deformable state, and thus it is possible for the exposed portions of the optical fibers to perform a movement to escape the compressive stress or the tensile stress due to the bending.

What is claimed is:

1. An optical connector cable comprising:
   a plurality of optical fibers each extending in a first direction;
   a lens module including a placement structure configured to place the plurality of optical fibers thereon in order in a second direction intersecting the first direction and a plurality of lenses optically coupled to tip ends of the plurality of optical fibers; and
   an adhesive portion fixing the plurality of optical fibers to the placement structure with an adhesive, the adhesive portion including a first adhesive portion located near the tip ends of the plurality of optical fibers and a second adhesive portion located behind the first adhesive portion in the first direction, wherein the second adhesive portion has a Young's modulus higher than that of the first adhesive portion.

2. The optical connector cable according to claim 1, wherein the second adhesive portion is formed of an adhesive having a Young's modulus of 400 MPa or more after curing.

3. The optical connector cable according to claim 1, wherein the first adhesive portion is formed of an acrylic-based adhesive, and the second adhesive portion is formed of an epoxy-based adhesive.

4. The optical connector cable according to claim 1, further comprising:
   a lid covering at least a part of the plurality of optical fibers placed on the placement structure,
   wherein at least a part of the first adhesive portion is located between the lid and the placement structure, and
   wherein at least a part of the second adhesive portion is located behind the lid in the first direction.

5. The optical connector cable according to claim 4, wherein the lid is a light transmitting member, and an adhesive forming at least one of the first adhesive portion and the second adhesive portion is a photocurable adhesive.

6. The optical connector cable according to claim 1, further comprising:
   a holding member having an end surface from which the plurality of optical fibers protrude and collectively holding the plurality of optical fibers; and
   a circuit board on which the lens module and the holding member are mounted,
   wherein the holding member is fixed to the circuit board with a third adhesive portion having a Young's modulus higher than that of the first adhesive portion.

7. The optical connector cable according to claim 6, wherein an adhesive forming the third adhesive portion is the same type of adhesive as the adhesive forming the second adhesive portion.

8. The optical connector cable according to claim 6, wherein the holding member and the lens module are separated from each other, and the plurality of optical fibers are in a deformable state in the separated region.

9. The optical connector cable according to claim 1, wherein each of the plurality of optical fibers includes a coated portion in which a glass fiber is coated with a resin and a coating removed portion from which the resin that coats the glass fiber is removed, and the coating removed portion of each of the plurality of optical fibers is fixed to the placement structure with the first adhesive portion.

10. The optical connector cable according to claim 9, wherein the coated portion of each of the plurality of optical fibers is fixed to the lens module with the second adhesive portion.

11. The optical connector cable according to claim 9, further comprising:
   a lid covering the coating removed portion of each of the plurality of optical fibers placed on the placement structure, wherein, in a plan view, the rear end of the lid is located at the coating removed portion.

12. The optical connector cable according to claim 11, wherein the placement structure includes a plurality of grooves each extending in the first direction, and the coating removed portion of each of the plurality of optical fibers is placed in a corresponding groove among the plurality of grooves, and
   wherein the first adhesive portion is located between the plurality of grooves, the coating removed portion, and the lid.

* * * * *